United States Patent [19]

McKinney

[11] Patent Number: 4,523,631
[45] Date of Patent: Jun. 18, 1985

[54] VEHICLE AIR CONDITIONING AND HEATING SYSTEM

[76] Inventor: David A. McKinney, 6754 Tara Blvd. - J2, Jonesboro, Ga. 30236

[21] Appl. No.: 493,716

[22] Filed: May 11, 1983

[51] Int. Cl.³ .............................................. B60H 3/00
[52] U.S. Cl. .................................... 165/43; 62/238.3; 62/323.2
[58] Field of Search .................... 62/323.2, 238.3, 239, 62/324.2; 165/42, 43, 62, 63

[56] References Cited

U.S. PATENT DOCUMENTS

| | | | |
|---|---|---|---|
| 2,327,451 | 8/1943 | Perrine | 62/238.3 X |
| 2,659,214 | 11/1953 | Coggburn | 62/323.2 X |
| 2,783,622 | 3/1957 | Bourassa | 165/43 X |
| 2,839,274 | 6/1958 | Polin | 165/43 X |
| 2,990,694 | 7/1961 | Kummerlowe et al. | 62/323.2 X |
| 3,021,681 | 2/1962 | Perry | 62/7 |
| 3,059,449 | 10/1962 | Dilliner | 165/43 X |
| 3,077,083 | 2/1963 | Kubo et al. | 62/238.3 X |
| 3,101,599 | 8/1963 | Pippert, Sr. et al. | 62/238.3 |
| 3,142,161 | 7/1964 | House | 62/238.3 |
| 3,209,551 | 10/1965 | Jentet | 165/31 |
| 3,661,200 | 5/1972 | McNamara | 165/43 X |
| 4,072,186 | 2/1978 | Barton | 165/43 |
| 4,307,575 | 12/1981 | Popinski | 62/148 |

Primary Examiner—William E. Tapolcai
Attorney, Agent, or Firm—Newton, Hopkins & Ormsby

[57] ABSTRACT

A combined automotive vehicle heating and cooling system utilizes the existing heating coil and blower inside of the passenger compartment and utilizes the engine coolant circulated by the existing engine driven coolant pump in both the heating and air conditioning modes. An absorption refrigeration system external to the passenger compartment utilizes waste heat from the engine coolant normally dissipated by the engine coolant system radiator. The same coolant pump circulates hot engine coolant through a generator of the absorption refrigeration system to provide energy for the refrigeration cycle without the necessity for a compressor and associated devices. Engine loading by the refrigeration system is substantially eliminated. The refrigeration system operates adequately to provide air conditioning even at slow engine idling. In a separate circuit, a low energy pump circulates coolant through a refrigerant evaporator and then through the existing coil in the passenger compartment adjacent to the existing blower.

5 Claims, 2 Drawing Figures

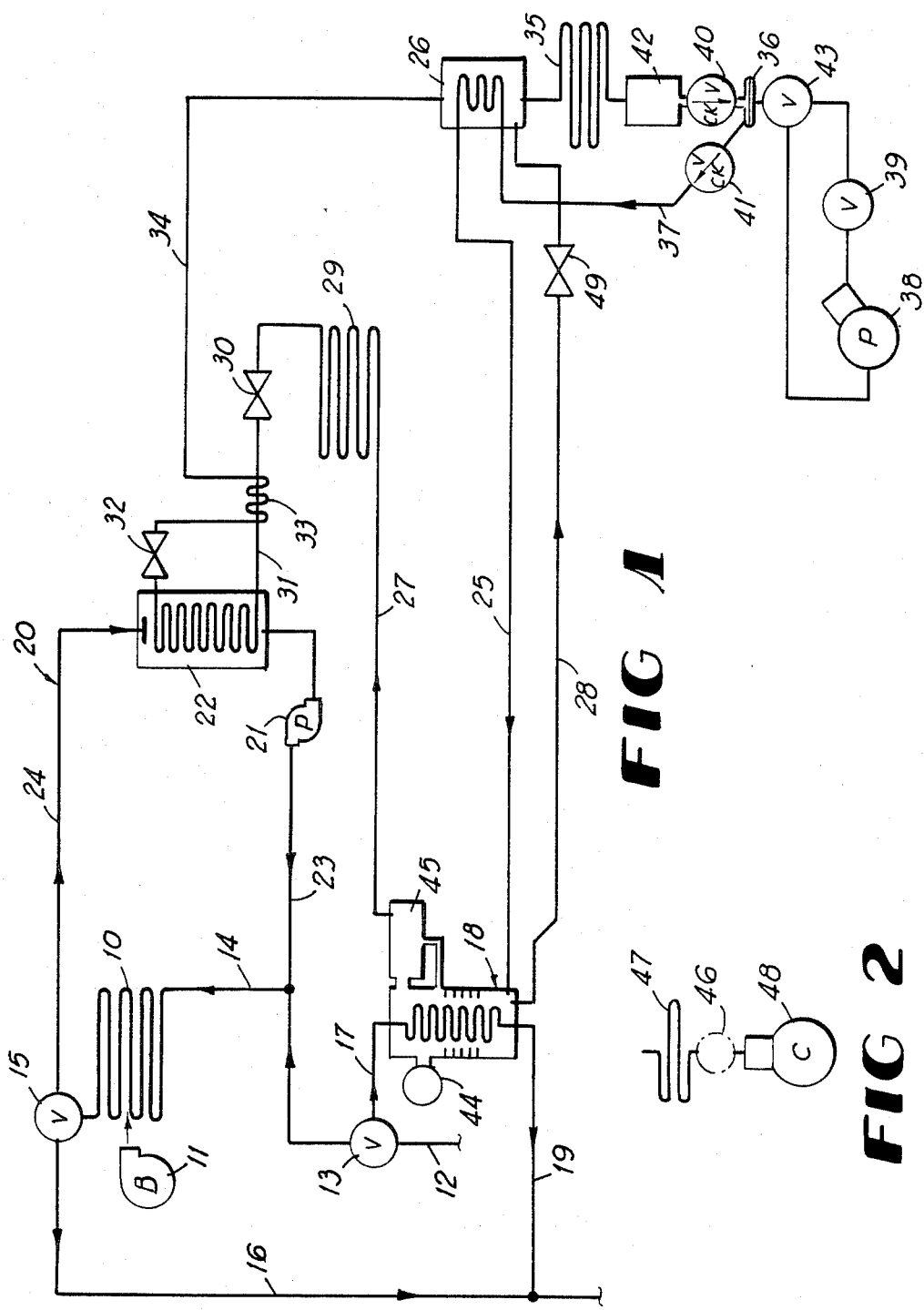

VEHICLE AIR CONDITIONING AND HEATING SYSTEM

BACKGROUND OF THE INVENTION

This invention has for its main objective to provide a better, more practical and less expensive integrated heating and cooling system for automobiles and the like. Heretofore, most automobiles have been equipped with separate heating and air conditioning systems involving independent and separate heating and cooling coils in the passenger compartment and separate blowers to circulate air over these coils at proper times.

Conventionally, automotive vehicle air conditioning systems involve an engine driven compressor as a part of the refrigeration system employing a hydrocarbon refrigerant. The driving of the compressor with the associated clutch, pulleys and belts places a considerable load on the engine requiring fast idling of the engine to avoid stalling under the load caused by the compressor during the air conditioning cycle. This is particularly objectionable with today's smaller automobile engines where all available horse power is necessary for safe acceleration and passing.

SUMMARY OF THE INVENTION

In light of the above, the present invention seeks to provide a simpler, lighter and less costly combined system for heating and cooling the vehicle at required times wherein the air conditioning compressor, clutch and associated components are eliminated entirely. In lieu of the traditional mechanical refrigeration system in present-day automobiles, an absorption refrigeration system is employed, including a generator which utilizes normally wasted heat present in the engine coolant (water-glycol) to provide the necessary energy to operate the absorption system in lieu of the usual compressor.

The resulting combined system allows hot engine coolant and chilled coolant selectively to be circulated through the single existing coil within the passenger compartment and to be acted on by the single existing blower to provide heating or cooling of the passenger compartment, as desired. One coil and one blower usually present are eliminated entirely in the simplified system.

An alternative embodiment of the invention involves employing a hot gas heated generator to serve as a boost absorption system using the hot gas from the compressor of an electric air-conditioning system to increase the total capacity of any electric system.

Other possible options include preheating water delivered to the generator of the absorption refrigeration system by means of the exhaust manifold, and secondarily heating the refrigerant by means of exhaust manifold heat.

A still further feature of the invention comprises the utilization of the existing power steering pump of the vehicle to operate a diaphragm pump used to pass the strong refrigerant solution from the solution condenser back to the absorber, or by using a hydraulic driven pump.

Other features and advantages of the invention will become apparent during the course of the following description.

BRIEF DESCRIPTION OF THE DRAWINGS

FIG. 1 is a schematic view of a combined heating and air conditioning system for vehicles according to the invention.

FIG. 2 is a partial schematic view of an alternative embodiment of the invention employing a hot gas heated generator.

DETAIL DESCRIPTION

Referring to FIG. 1 in detail, wherein like numerals designate like parts, a combined automotive vehicle heating and air conditioning integrated system is shown. An existing heating coil 10 in the passenger compartment of the vehicle is modified in the invention to provide both heating and cooling. An existing heater blower 11 is operated during the heating and cooling cycles to direct air over the coil 10.

During the heating cycle of the combined system, hot coolant from the engine, not shown, usually a mixture of water and glycol, is delivered by the conventional engine driven water pump, not shown, to a delivery line 12 at a temperature of about 190° F. This hot coolant, after passing a manual three-way valve 13, enters an inlet line 14 leading to the coil 10. After passing through the coil 10 which now acts as a heating coil in conjunction with the blower 11 to heat the passenger compartment, the coolant passes through a second manual three-way valve 15 and enters a return line 16, which line delivers the hot coolant back to the internal combustion engine.

During the cooling or air conditioning cycle, the same hot engine coolant is delivered by the existing coolant pump through the line 12 to the manual three-way valve 13 which is adjusted to direct the hot coolant through another line 17 to a generator 18 of the absorption refrigeration system utilized in the invention. The heat extracted by the generator 18 (heat exchanger) from the hot coolant delivered to it by the line 17 provides the necessary thermal energy for the absorption refrigeration cycle. The generator 18 is used in lieu of a compressor, clutch, pulley and belts required in the conventional mechanical refrigeration system found on present day automobiles.

After passing through the generator 18, the hot coolant passes through a return line 19 connected into the main return line 16 which delivers the coolant back to the engine.

Using the same engine coolant (water-glycol) in a separate chilled water circuit 20, a fractional horse power pump 21 circulates the coolant through a refrigerant evaporator 22, lowering the coolant temperature to about 40° F.–45° F. Such chilled water is then delivered by the pump 21 through a line 23 to the line 14 and then through the coil 10 which now functions in conjunction with the blower 11 as a cooling or air conditioning coil. It may be seen that the use of the coil 10 and blower 11 for both heating and cooling eliminates completely one coil and one blower customarily found on automobiles.

After the chilled water flows through the coil 10 in the cooling cycle, it passes through the three-way valve 15 which has been adjusted to send the coolant through a line 24 back to the inlet of the evaporator 22, thus completing the chilled water circuit 20.

Another line 25 connected into the generator 18 delivers a strong solution of anhydrous ammonia, the refrigerant, and distilled water, the carrier, from an absorber 26 to the generator. Leaving the high pressure outlet of the generator 18 at a pressure of about 200 psi to 300 psi through a line 27 is the ammonia refrigerant in vapor form. A third line 28 leaving the generator 18 returns the weak solution of refrigerant and distilled water through restrictor valve 49 to the absorber 26.

The high pressure line 27 from the generator delivers refrigerant vapor to a refrigerant condenser 29 where the refrigerant is liquified, and then is passed through a restrictor valve 30 to a low pressure extension 31 of the line and then on to the evaporator 22 where the refrigerant boils off.

From the evaporator, the refrigerant passes through another restrictor valve 32 and preferably through a heat exchanger 33 surrounding the line 31. From the heat exchanger 33, the refrigerant enters a line 34 which returns it to the absorber 26 under low pressure as a vapor.

At the absorber 26, the ammonia refrigerant is again mixed with the carrier, distilled water, and is passed from the absorber to a solution condenser 35 where the ammonia is further dissolved in the water to strengthen the solution. From the solution condenser 35, the strong refrigerant solution is cycled back through a separate coil in the absorber 26 for further cooling and is then delivered from the absorber back to the generator 18 through line 25.

A diaphragm pump 36 for moving the strong solution from the solution condenser 35 back to the absorber 26 through a line 37 may be operated from the existing vehicle power steering pump 38 having an existing power steering control valve 39. In lieu of this pumping arrangement, a hydraulic driven pump or a small electric pump, not shown, may be employed to send the strong refrigerant solution from the solution condenser 35 back to the absorber 26 through the line 37. Where the diaphragm pump 36 is used, as indicated in the drawing, check valves 40 and 41 are placed between a solution receiver 42 and the inlet of pump 36 and in the return line 37. These check valves are not required where a small electric pump is used instead of the diaphragm pump 36. An electric control valve 43 is placed in the system to control the operation of the diaphragm pump to approximately one hundred pulsations per minute under approximately four hundred psi pressure to zero.

It should be noted that the generator 18 is equipped with a solution level indicator 44 and a leveler reservoir 45.

In an alternative embodiment of the invention shown in FIG. 2, the generator 18 can be replaced by a hot gas heated generator 46 between the condenser 47 and the compressor 48 of a mechanical refrigeration system to serve as a booster for this system whereby the hot gas from the compressor of an electric air-conditioning system is used, increasing the total capacity of any electric system.

The advantages of the described combined vehicle heating and cooling system utilizing absorption refrigeration, particularly in connection with modern day smaller automotive engines should now be readily apparent to those skilled in the art.

It may be mentioned that a temperature differential of approximately 8° F.–10° F. exists between the inlet and outlet terminals of the coil 10. The refrigerant solution is approximately 2 parts distilled water and 1 part R-717 anhydrous ammonia with a conventional inhibitor to deter corrosion. At an ambient temperature of 95° F., the low side pressure in the system is approximately 53–60 pounds and the high side pressure is about 300 pounds. Approximately 10 ounces of R-717 anhydrous ammonia and 20 ounces of distilled water are required for a 12,000 BTU (1 ton) capacity system. The approximate pressure of the refrigerant in the low pressure line 34 is 40 psi to 60 psi.

The chilled coolant circulating pump 21 preferably has a pumping capacity of about 2 gpm. All interconnecting lines can be of steel, aluminum or hose, while all heat exchangers can be either aluminum or steel construction. The small amount of absorbent and refrigerant circulation required shows that $\frac{1}{4}''$ pipe or hose will be adequate. Velocities are not critical in this type of system.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A unified heating and air conditioning system for automotive vehicles and the like comprising a circulating loop for hot vehicle engine coolant under the influence of an engine operated coolant pump, a heating-cooling coil connected in said circulating loop and being at least partly in the passenger compartment of a vehicle having a blower means to direct an air stream over the heating-cooling coil, an independent engine coolant circulating loop including a common branch with the first-named circulating loop, the common branch containing said heating-cooling coil, pumping means to circulate engine coolant through the independent loop, an absorption refrigeration system external to the passenger compartment of a vehicle including a refrigerant evaporator connected in said independent loop to chill the engine coolant being pumped through such loop and a generator, and a second circulating loop for hot engine coolant under influence of said coolant pump connected into the first-named circulating loop and including said generator, whereby normally wasted heat in the hot engine coolant is utilized by the generator as thermal energy to operate the absorption refrigeration system, and valving connected between the first-named, independent and said second circulating loops to selectively control the flow of engine coolant therethrough at required times, and the absorption refrigeration system further comprising a refrigerant condenser connected between said generator and said refrigerant evaporator, an absorber connected between the evaporator and said generator, a solution condenser connected with the absorber, solution pumping means connected between the solution condenser and the absorber, and restrictor valve means connected between the refrigerant condenser and evaporator and between the evaporator and the absorber.

2. A unified heating and air conditioning system as defined in claim 1, including a refrigerant line interconnecting the refrigerant condenser and evaporator and a heat exchanger connected between the last-named restrictor valve means and the absorber and being in heat transfer relationship with said refrigerant line.

3. A unified heating and air conditioning system as defined in claim 1, and said solution pumping means comprising a diaphragm pump, and control and operating means for the diaphragm pump including the existing power steering pump of the vehicle.

4. A unified heating and air conditioning system as defined in claim 1, and a pair of strong and weak refrigerant solution lines connected between said generator and said absorber.

5. An air conditioning system for vehicles equipped with a thermal transfer coil and an air blower adapted to direct an air stream over said coil, the vehicle having a liquid cooled engine and a liquid coolant circulating pump, the improvement comprising an absorption refrigeration system including a generator, means including the liquid coolant circulating pump for circulating hot engine coolant through the generator and back to the engine, whereby the generator receives thermal energy needed to operate the absorption refrigeration system, a refrigerant evaporator, means including a second pump for circulating liquid engine coolant through the evaporator and through said thermal transfer coil a refrigerant condenser connected between said generator and evaporator, an absorber unit, strong and weak refrigerant solution lines interconnecting said generator and absorber unit, a solution condenser connected with said absorber unit, pumping means for returning a strong solution from the solution condenser back to the absorber unit, and restrictor valve means connected between the refrigerant condenser and evaporator and between the evaporator and the absorber.

* * * * *